June 3, 1969   M. HIMMELHEBER ET AL   3,447,996
STRATIFIED WOOD COMPOSITION PANEL
Filed June 7, 1966
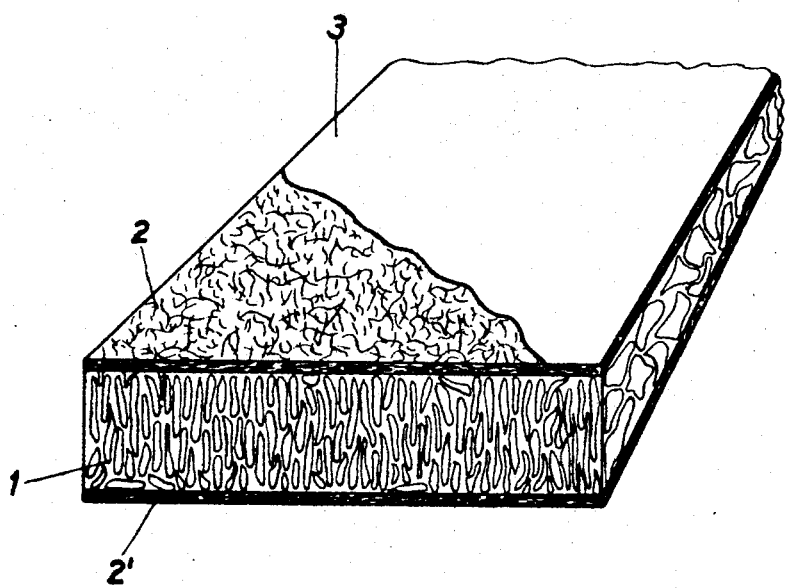
Inventor:

United States Patent Office 3,447,996
Patented June 3, 1969

3,447,996
STRATIFIED WOOD COMPOSITION PANEL
Max Himmelheber, 7 Saarstrasse, 7292 Baiersbronn, Black Forest, Germany, and Klaus Steiner, 1 Auf dem Krebet, 34 Gottingen-Nikolausberg, Germany
Filed June 7, 1966, Ser. No. 555,854
Claims priority, application Germany, June 10, 1965, H 56,264
Int. Cl. B32b 21/10
U.S. Cl. 161—55        8 Claims

ABSTRACT OF THE DISCLOSURE

A stratified wood panel including at least one covering layer of bonded wood fibers, oriented substantially parallel to the panel plane, secured to a core of bonded wood chips oriented substantially perpendicular to the panel plane.

---

Our invention relates to stratified wood composition panels and, more particularly, to panels comprising a middle or core layer pressed from chips, shavings or other wood particles by extrusion molding. For sufficient bending strength and desired surface qualities such extruded panels are covered with top layers of veneer, plastic foil or other laminates, or the core is coated by a flat-pressing process with thin and planar wood shavings in several thick and dense layers. If the extruded core layers are to be covered with thin high-quality surface veneers, which in some cases are to be given a high-gloss polish, a blind veneer of sufficient thickness must be interposed between metal core layer and surface veneer, requiring a rather expensive production process. Foils of synthetic plastic glued to the extrusion-molded middle layer, as well as laminates of synthetic resin and paper pressed upon the middle layer, exhibit an extremely poor, porous and wavy surface which falls short of satisfying commercial requirements so that products of this type have not found appreciable use in practice. Nor have sufficiently good surfaces been attained with layers of thin and planar shavings pressed upon extrusion-molded middle layers, particularly if covered with thin high-quality surface veneers to be subsequently polished; and similar failure has been encountered with coatings formed of synthetic plastic foils or other synthetic laminates. In all of these products the shavings of the layer pressed upon the extrusion-molded middle layer and located beneath the outer veneer, tend to telegraph through the veneer, foils or other surface laminates, thus resulting in surface irregularities which render the resulting product inferior or unsuitable. Due to the low E-modulus of the cover layers formed of shavings, the mechanical stability of such panels is likewise insufficient.

Covering and bonding the flat-particle pressed panels with synthetic plastic laminates requires a pressure of about 20 kg./cm.$^2$ to 50 kg./cm.$^2$ at a temperature of 150 to 180° C. for a pressing period of 5 to 15 minutes. This causes the panel material to be greatly compressed, namely by a few millimeters, and incurs the appreciable disadvantage that the amount of compression varies greatly and irregularly, which considerably aggravates the further fabrication of such laminated panels or virtually renders their further use infeasible. This is one of the main reasons why such panels have not found appreciable application in practice.

If, for preventing the middle layer from being pressed together during the laminating process, the middle layer is given a higher specific gravity and formed of hardwood chips, the above-described deficiency is somewhat reduced, but the irregularity in compression of the panel during the laminating process is not eliminated in this manner.

It is therefore infeasible to produce flat-particle pressed panels with synthetic plastic laminates in such a manner as to assure the sufficiently small thickness tolerances required in industry for further fabrication of such products. Flat-particle pressed panels having a middle layer produced of hard-wood chips have the further disadvantage that the high specific gravity impairs the stability, aside from the fact that the otherwise unnecessarily high volumetric weight increases the cost of further fabrication as well as the shipping expenses.

It is therefore an object of our invention to device a laminated or multi-layer panel formed of wood composition material that avoids the above-described disadvantages of the known laminated panels. More specifically, it is an object to produce panels of the above-mentioned kind in which no pressing or telegraphing of middle-layer or cover-layer particles into or through the synthetic plastic laminates occurs, and which also possess the other surface qualities desired of laminates of synthetic material, such as a smooth, dense, closed and swell-resistant surface, high bending strength, good stability, as well as high resistance to transverse pressure and transverse tensile forces.

We have found, according to our invention, that these objects are achieved in a technologically simple and economical manner by composing the wood composition panel of a middle layer formed of an extruded wood chip board in which the individual chips, shavings or the like area-type particles are oriented in directions substantially perpendicular to the plane of the panel, and of one or two cover layers formed of an adhesive-carrying wood fiber material in such a manner that the wood fibers extend in directions substantially parallel to the panel plane and hence transverse to the direction of the chips in the middle layer.

The wood fiber material of which the cover layers are formed consists substantially of individual fibers preferably produced by the dry method. The production of such a fiber material is known as such. The fibers, for example, are produced by an explosion process and/or by means of disc-type disintegrators, the resulting individualized fibers being subsequently subjected to further manufacturing processes while in dry condition.

The use of such cover layers, consisting of finest obtainable individual fibers, as contrasted to cover layers consisting of chips or shavings, for covering an extrusion-pressed middle layer having its chips or shavings extend substantially perpendicularly to the panel plane, has been found to result in unexpected technological advantages. The individually very strong wood fibers in the cover layers, extending substantially parallel to the panel plane, impart to the panel a higher bending and tensile strength than attainable with cover layers formed of fine flat shavings, whereas the middle or core layer, having the longitudinal axes and longitudinal areas of its chips or shavings extend substantially in planes perpendicular to the plane of the panel, imparts to the product a higher strength with respect to pressure and transverse pulling forces than attainable with middle layers formed of differently oriented flat shavings. Due to the fine structure of the wood fibers, the cover layers are especially tight, sealed and very smooth, as well as highly resistant to effects otherwise apt to cause swelling.

The particular quality of panels according to the invention is manifested by the fact that the fibers of the other layers will not become discernible, such as by telegraphing, through the laminates to be subsequently added, and that the highly resistant cover layers also block or equalize any unevenness or irregular working of the chips in the extruded middle layer, thus resulting in fully satisfactory, smooth surfaces of the subsequently added laminates. This affords and facilitates, for example, the use of solid-color and high-gloss foils of synthetic plastic or other laminate surfaces. Furthermore, since a panel according to the invention possesses a very high resistance to pressure perpendicular to the panel plane, the panel when coated with laminates can be readily given sufficiently small thickness tolerances, even if increased compressing forces are employed for depositing and bonding the laminates.

Particularly favorable qualities of the cover layers are obtained if, according to another feature of our invention, each of the adhesive-coated or impregnated cover layers of wood fiber material has a thickness of more than 0.8 mm., preferably 1.0 mm. to 2.0 mm. in the pressed and finished condition of the panel. The high strength of the cover layers made of fiber material in a panel according to the invention, affords using as middle layer an extruded product of particularly low specific gravity. For example, the specific gravity of the extruded middle layer may be about 450 to 550 kg./m.$^3$. If desired, the middle layer may be formed by a plate composed of tubes, having a still lower over-all specific gravity.

For further improving the manufacturing economy of stratified wood composition panels according to the invention, the wood fiber material used in the cover layers may be given an admixture of grinder dust, preferably resulting from grinding of wood composition or plywood panels. In some cases, the admixture to the fiber material may consist of comminuted wood particles, for example planer shavings or sawdust. Since the fibers in the cover layers are very fine as compared with the thickness of the cover layers, the fibers near the outer side of each cover layer may be selected to have smaller thickness than the fibers at the side resting against the extruded middle layer. Such fibrous cover layers can be produced from a fiber mat formed by deposition of relatively coarse fibers at the bottom side and deposition of very fine fibers on top (or vice versa), the different masses of fibers gradually merging into each other in a transition zone from coarse to fine. This affords further improving the economy of the manufacturing operation.

The single figure of the accompanying drawing illustrates in schematical perspective a portion of a panel according to the invention by way of example.

The panel comprises an extrusion-pressed chip board 1 whose chips or other particles have their respective areas extend substantially in planes perpendicular to the panel surface. The extruded core layer 1 is integrally joined on both sides with respective cover layers 2 and 2′ of fiber material whose individual fibers are oriented substantially parallel to the panel surface. The outer surface of each cover layer is coated with a lamination 3 of synthetic resin.

Such a combination of an extrusion-pressed board whose chips or shavings extend perpendicular to the panel plane with cover layers of wood fibers transverse to the wood particles of the cover layer, secures a considerable increase in bending strength with respect to both directions of the panel. Heretofore extrusion-pressed panels in which the chips extend perpendicular to the panel plane exhibited different values of bending strength at different respective localities along longitudinal and transverse directions relative to the extrusion machine used for pressing the panel; but this deficiency is eliminated by virtue of the combination with the above-described fibrous cover layers. Furthermore, a panel according to the invention achieves a considerable improvement of the surface qualities. Normally, extrusion-pressed wood chip panels have a very strong tendency to swell in the longitudinal direction; but by virtue of the above-described cover layers of fine fibrous material this deficiency is likewise minimized down to no more than the normal swelling tendency. As a result, extrusion-pressed panels, heretofore useful to a limited extent only, become applicable virtually for all purposes of panels in general. Heretofore, extrusion-pressed panels had to be given a relatively high specific gravity in order to render them suitable for transportation. In contrast thereto, an extrusion-pressed panel with cover layers of fiber material according to the invention permits giving the middle layer a greatly reduced specific gravity. This results in appreciable savings with respect to material and hence in a more economical production of the panels.

The known extrusion-pressed panels with chips transverse to the panel plane (so-called upright chips) possess a very high resistance to pressure forces. Panels with fibrous cover layers according to the invention are well suitable for enclosures, which opens up further fields of use for such panels. Due to the slight thickness of the fibers, the distribution of the fibers in the cover layers is uniform. That is, many fibers and substantially uniform numbers of fibers are located one above the other with respect to the height of each cover layer in each unit area, thus securing uniform distribution of pressure, uniform densification, uniform surface qualities and uniform swelling within the panel.

We claim:
1. A wood composition panel, comprising an extruded core layer formed substantially of wood chips oriented in directions substantially perpendicular to the panel plane, and having at least one layer covering said core layer and bonded thereto, said covering layer being formed of substantially individual adhesive-carrying wood fibers oriented substantially parallel to the panel plane.
2. In a wood composition panel according to claim 1, said cover layer having a thickness of more than 0.8 mm.
3. In a wood composition panel according to claim 1, said cover layer having a thickness of 1.0 mm. to 2 mm.
4. In a wood composition panel according to claim 2, said core layer having a volumetric weight of about 450 to 550 kg./m.$^3$.
5. In a wood composition panel according to claim 1, said cover layer containing an admixture of wood dust material interspersed between said fibers.
6. In a wood composition panel according to claim 1, said fibers near the outer side of said cover layer having a smaller diameter than those adjacent to said middle layer.
7. A wood composition panel according to claim 1, comprising a lamination on top of the cover layer, said lamination being thinner than said cover layer.
8. In a wood composition panel according to claim 7, said lamination consisting of synthetic plastic.

References Cited
UNITED STATES PATENTS

| | | | |
|---|---|---|---|
| 1,911,374 | 5/1933 | Loetscher | 156—258 XR |
| 2,854,696 | 10/1958 | Kreibaum | 161—162 XR |
| 2,960,423 | 11/1960 | Kreibaum | 161—162 XR |
| 2,992,152 | 7/1961 | Chapman | 156—280 XR |
| 3,185,614 | 5/1965 | Van Hartesveldt et al. 264—123 XR |

ROBERT F. BURNETT, *Primary Examiner.*

W. A. POWELL, *Assistant Examiner.*

U.S. Cl. X.R.

156—244, 279, 280; 161—59, 162, 166; 264—113